US007848355B2

(12) United States Patent
Dettori et al.

(10) Patent No.: US 7,848,355 B2
(45) Date of Patent: Dec. 7, 2010

(54) RESOURCE ALLOCATION IN PEER-TO-PEER STREAMING

(75) Inventors: Paolo Dettori, Hartsdale, NY (US); Zhenghua Fu, Yorktown Heights, NY (US); Julio Nogima, Tarrytown, NY (US); Frank Andre Schaffa, Hartsdale, NY (US); Chai Wah Wu, Poughquag, NY (US); Peter Hans Westerink, Ossining, NY (US); Hao Yang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 12/261,973

(22) Filed: Oct. 30, 2008

(65) Prior Publication Data
US 2010/0111102 A1 May 6, 2010

(51) Int. Cl.
*H04J 3/18* (2006.01)
(52) U.S. Cl. ................................. 370/477; 370/468
(58) Field of Classification Search ............. 370/477, 370/468
See application file for complete search history.

(56) References Cited

U.S. PATENT DOCUMENTS

| 2002/0031144 | A1 | 3/2002 | Barton |
| 2003/0202476 | A1* | 10/2003 | Billhartz et al. ............ 370/236 |
| 2004/0001512 | A1* | 1/2004 | Challener et al. ........... 370/468 |
| 2005/0141554 | A1* | 6/2005 | Hammarlund et al. ...... 370/468 |
| 2006/0007947 | A1 | 1/2006 | Li et al. |
| 2006/0053209 | A1* | 3/2006 | Li ............................... 709/217 |
| 2006/0215556 | A1 | 9/2006 | Wu et al. |
| 2007/0104215 | A1 | 5/2007 | Wang et al. |
| 2007/0133592 | A1 | 6/2007 | Zheng |
| 2007/0280255 | A1* | 12/2007 | Tsang et al. ............. 370/395.2 |
| 2008/0037562 | A1 | 2/2008 | Saleh et al. |
| 2008/0300889 | A1* | 12/2008 | Dawson et al. ................. 705/1 |
| 2008/0300975 | A1* | 12/2008 | Dawson et al. ................ 705/14 |
| 2009/0210545 | A1* | 8/2009 | Wright ....................... 709/230 |

FOREIGN PATENT DOCUMENTS

| CN | 1777120 | 5/2006 |
| EP | 1667377 | 6/2006 |

OTHER PUBLICATIONS

Chuan Wu Baochun Li, "On Meeting P2P Streaming Bandwith Demand with Limited Supplies," Department of Electrical and Computer Engineering, University of Toronto, Canada M5S 3G4, Submission to appear in Proceedings of the 15th Annual SPIE/ACM International Conference on Multimedia Computing and Networking (MMCN 2008), [Online}Jan. 30, 2008, pp. 1-12, XP002560131.

* cited by examiner

*Primary Examiner*—Kwang B Yao
*Assistant Examiner*—Juvena Loo
(74) *Attorney, Agent, or Firm*—Michael J. Buchenhorner; Derek S. Jennings

(57) ABSTRACT

A system and method for resource allocation in peer to peer streaming includes steps of: inferring global properties of a neighborhood made up of peer nodes, wherein the global properties are inferred from a summarization of information obtained locally at each peer node; allocating resources for each peer node to its neighbor nodes in accordance with propagated dependency information; and periodically updating the target rates as peer nodes join and leave the neighborhood.

19 Claims, 6 Drawing Sheets

```
ComputeTR()
{
/* At node i, it computes the average incoming rate for
all neighbors as avg_inrate. */ avg_inrate = sum(inrate(j))/#neighbors, for all j in
                       neighborhood /* Given the avg_inrate, it computes a delta as for each
neighbor j as delta(j) */ delta(j)= (avg_inrate – inrate(j)) * dep(j->i)

/* Based on delta(j), it computes a trial rate allocation for
each neighbor j as tr'(i->j) */ tr'(i->j) = max(0,tr'(i->j) + delta(j))

/* Compute a total trial rate as TR' */

TR' = sum(tr'(i->j)), for all j in neighborhood

/* Compute new allocation for this iteration as tr(i->j) */
    tr(i->j) = tr'(i->j)/TR*BW(i)'
}
```

*FIG. 3*

RESOURCE ALLOCATION IN PEER-TO-PEER STREAMING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of peer to peer streaming and more particularly relates to the field of allocating resources, i.e. bandwidth, CPU cycles, and so forth, in a peer to peer streaming environment.

BACKGROUND OF THE INVENTION

When broadcasting video/audio contents over the Internet using Peer to Peer (P2P) streaming, the bandwidth resources of leaf nodes, or nodes away from the source node (root node), are typically under-utilized. This leads to sub-optimal throughput performance of the entire streaming system.

There are two types of P2P streaming systems in existence today. The first type uses end host multicast (ESM, ChunkySpread). With ESM, all participating nodes form one or more spanning tree(s) that are rooted at the source. Because of the explicit tree structure, it responds poorly against the group dynamics (nodes joining and leaving the structure), and does a poor job of using the leaf node's bandwidth resources.

The second type of P2P streaming system uses mesh forwarding (CoolStreaming/DoNet, PPLive) where chunks of the content are exchanged among neighboring nodes without a pre-defined tree structure. It is more robust against group dynamics compared with the first type. Again, a drawback with this system is the sub-optimal throughput. Due to a lack of coordination among neighboring nodes, bandwidth resources are under-utilized in both of the above systems. Our experiments show current P2P streaming systems achieve throughput at about 50% of resource capacity. This prevents bandwidth-demanding content, such as high quality video, from being broadcasted using P2P streaming system. Currently, these applications are made possible by dedicated infrastructure support such as Content Distribution Network (CDN). The drawback of CDN systems, however, is the high cost of implementation since it requires a very specialized infrastructure.

In recent years, several peer-to-peer (P2P) streaming application, such as PPLive, Coolstreaming, and ESM, have gained popularity in broadcasting TV programs, live concerts/shows, lectures and seminars over the Internet. The capability to potentially scale up to a large audience with acceptable streaming quality enables P2P streaming applications to reach millions of end-users throughout the world.

The typical procedure (pull-based method) of forwarding at each node of a P2P streaming system is as follows:

A node checks its local buffer to see which chunks (portions of a file) are already downloaded and which are missing. It exchanges this availability information with its neighbors.

Given the availability information of its neighbors, the node identifies all chunks that are missing in its local buffer but are available in its neighborhood. These chunks are put into a working set.

The download decisions are made starting from rarest chunks, i.e. the chunks that are available at the fewest neighbors.

For chunks available from multiple neighbors, it selects the chunk with the best residual bandwidth.

It is important to note that the above method is a receiver driven pull-based method, where any chunk transfer is initiated by a request from the receiver and a sender only passively responds to those requests. A simple example shows that it yields sub-optimal throughput performance (as shown in FIG. 1). In FIG. 1A, a 3-node topology is shown, providing the bandwidth resource at each node. In FIG. 1B, the optimal bandwidth allocation is shown to be able to yield a source bandwidth rate of 10. In particular, the source allocates all bandwidth to node B. However, in the pull-based method, the source is passively pulled by all its neighbors. This leads to an even distribution of its bandwidth between A and B. As shown in FIG. 1C, source rate of only 5 is achievable by all the nodes.

We note that this example is for illustrative purposes only; a topology for practical use is far more complicated. Extensive simulations in various topologies show that the pull-based method achieves about 40% to 75% of optimal throughput. In order to achieve optimal throughput, from a global perspective, we need to maximize the minimum of the max-flow from source to each node. One problem is that the optimal solution requires global knowledge at each node, i.e. the overlay connectivity and bandwidth capacity of all the other participating nodes, which makes it impractical to be implemented.

There is a need for a method to overcome the above-stated shortcomings of the known art.

SUMMARY OF THE INVENTION

Briefly, according to an embodiment of the invention, a method for resource allocation in peer to peer streaming includes steps or acts of: inferring global properties of a neighborhood made up of peer nodes, from a summarization of information obtained locally at each peer node; allocating resource of each peer node to its neighbor nodes in accordance with propagated dependency information; and periodically updating the target rates as peer nodes join and leave the neighborhood. From the point of reference of a peer node, a neighborhood is defined as the set of all nodes with which the peer node can potentially exchange data.

The step of inferring global properties is further broken down as follows: computing resource allocation dependencies for each peer node based on local information; propagating the resource allocation dependency information for each peer node to its neighboring nodes; and calculating target rates for each neighbor node.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 3 is the pseudo-code for computing bandwidth allocation according to an embodiment of the present invention;

Figure 1A:
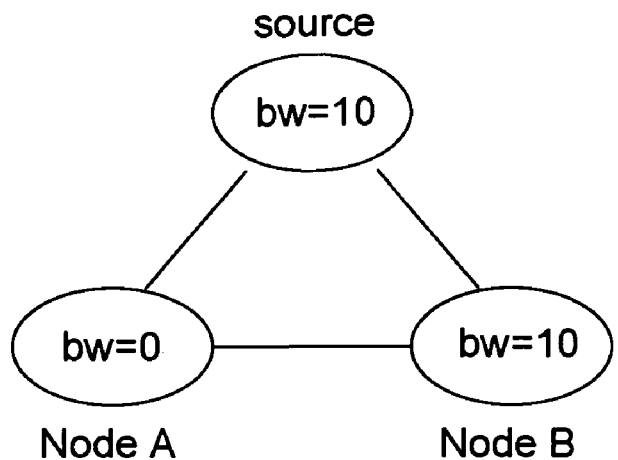
FIG. 1A is a simplified illustration of a peer to peer streaming system with three nodes, according to the known art.
Figure 1B:
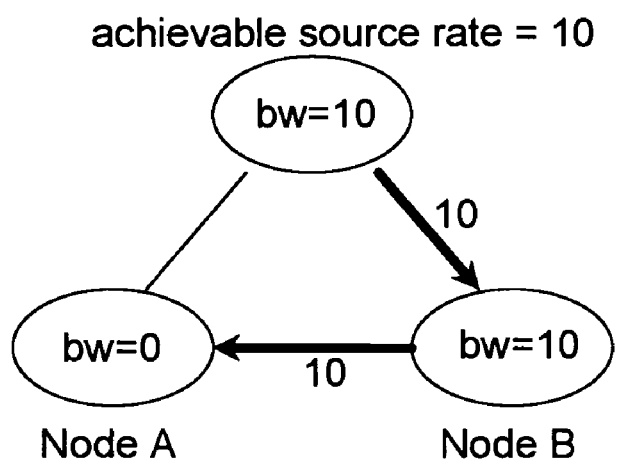
FIG. 1B is a simplified illustration of the system of FIG. 1A, showing total bandwidth calculations, according to the known art.
Figure 1C:
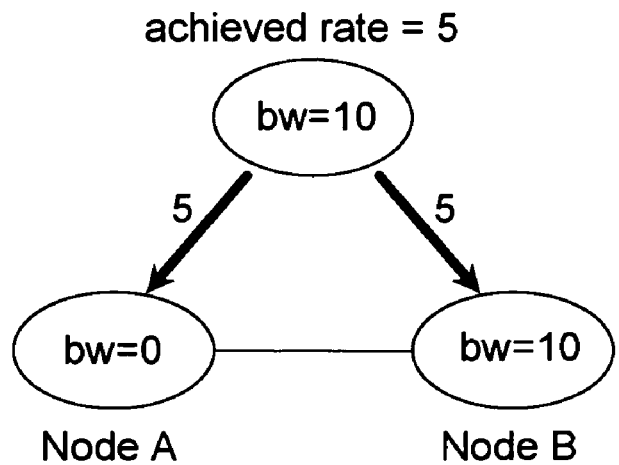
FIG. 1C is a simplified illustration of the system of FIG. 1A, showing achieved streaming rate, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We discuss a method for resource allocation based on local information that improves resource allocation among neighboring nodes in mesh forwarding P2P streaming systems. This method addresses the problems inherent in streaming systems such as streaming video, audio, and so forth, as discussed above. In order to achieve optimal throughput forwarding, from a global perspective, it is necessary to maximize the minimum of the max-flow from a source to each node.

The key concept behind this method is that we enable a node to infer global properties of the neighborhood where the node is located, without requiring the node to actually obtain and store the global properties, which would be significantly more processing intensive, or in some cases, not possible. Some content distributions systems do not use a dedicated server. These server-less systems do not store global properties in one place As used herein, a neighborhood of a node is defined as the set of all nodes with which the node can potentially exchange data.

We enable a node to infer global properties by summarizing locally obtained information such as upload peer bandwidth in such a way that the summarized information is equivalent to the global information, and then we can partition the peer to peer bandwidth according to the inferred global properties. The method requires little communication and processing overhead.

When such a method is used across the system, the bandwidth resources are better utilized due to improved coordination among neighboring nodes. Simulations show this method improves an overall streaming rate by about 15% to 25%. The benefits of this invention are 1) throughput improvement in pull-based P2P streaming systems, 2) maintaining robustness against group dynamics, 3) simple to implement and requires little overhead in both communication and CPU resources. Using the example of FIG. 1A, the achievable source rate with the claimed method is 7.5, which is a 25% improvement over existing methods.

A goal of the method is to improve throughput by better utilization of the resources among all nodes. This is done by allocating each peer node's resources contribution to its neighbors in such a way that every node receives an approximately equal incoming rate in a global setting. The method, according to an embodiment of the present invention, calculates the target out-going rate for each neighbor node and such target rates are dynamically updated periodically as nodes join and leave the neighborhood. Throughout this document we will refer to a reference node as i; a neighbor node as j; and a non-source node as k. The description that follows will use for illustrative purposes the network bandwidth as the resource to be optimized.

Initially, all nodes advertise or announce their bandwidth per-non-source connection (BPC) as a guideline for how much each node can contribute in its local neighborhood. Then, every node i computes a dependency based on neighboring BPC dep(i->j)=BPC(j)/sum(BPC(k)), for all k in i's neighborhood. This indicates node j's dependence on node i's bandwidth contribution.

Figure 2:
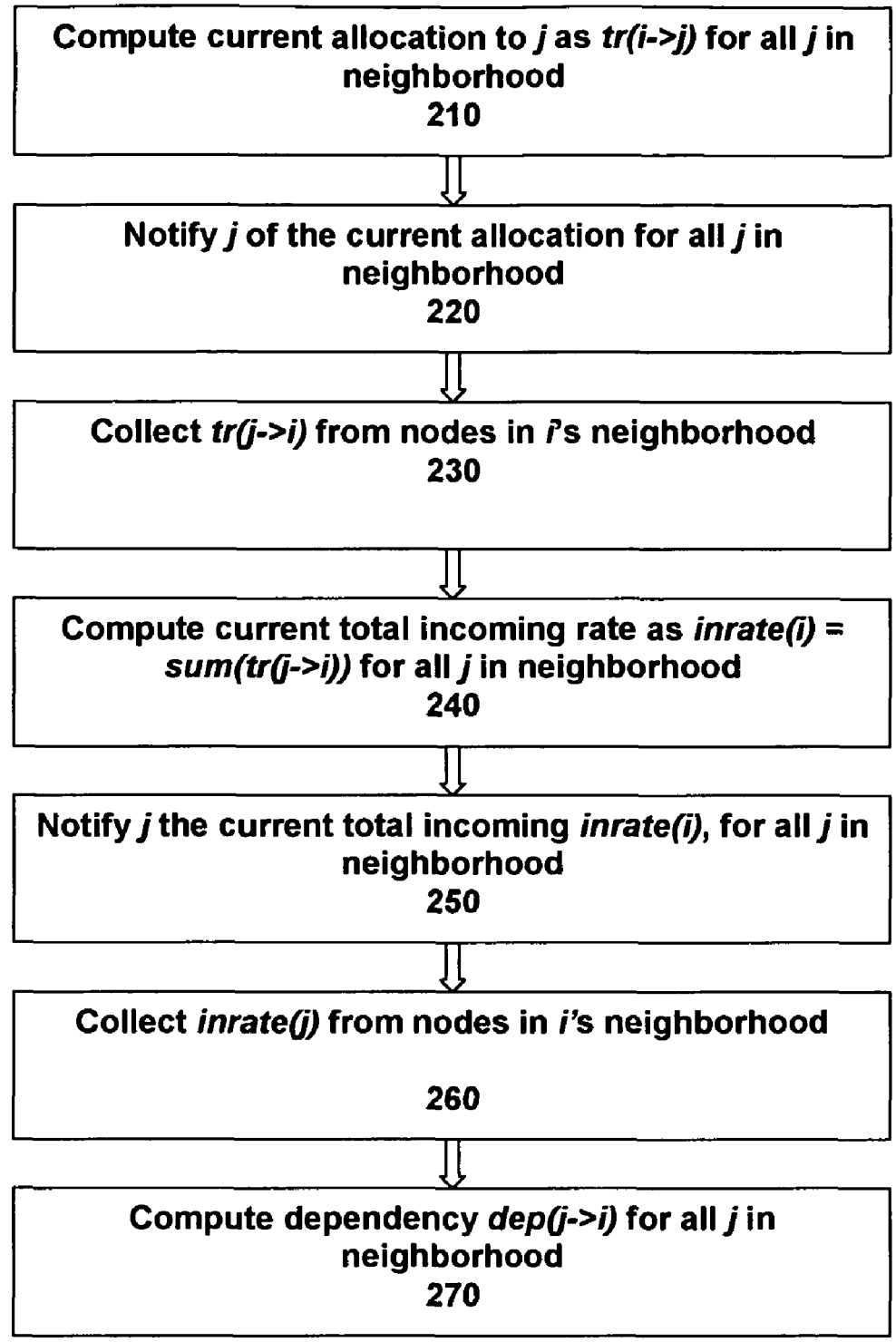
FIG. 2 is a high level flow chart of the method for bandwidth allocation with multiple iterations, according to an embodiment of the invention.
Figure 4A:
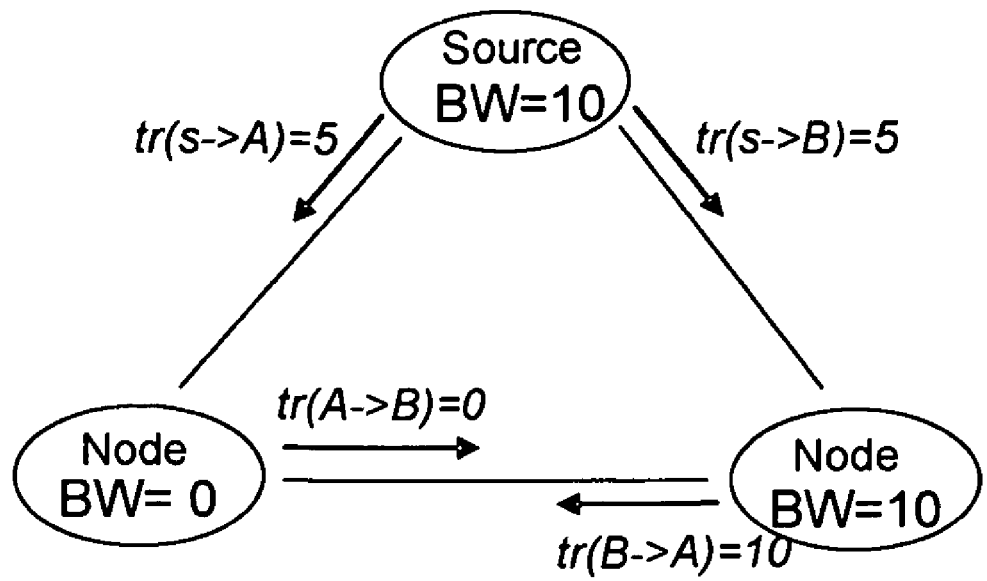
FIG. 4A is a simplified illustration of nodes with initial target rates, according to an embodiment of the present invention.

An overview of this method is provided in the high-level flowchart 200 of FIG. 2. In step 210 node i computes its current bandwidth allocation (target rate, "tr") to neighbor j as tr(i->j) for all j in the neighborhood, as shown in FIG. 4A. In step 220, node i notifies neighbor node j of its current allocation for all of its neighboring nodes by sending network messages carrying corresponding information of tr(i->j). You will note from FIG. 4A that the source node s does not need upload bandwidth allocation.

Figure 4B:
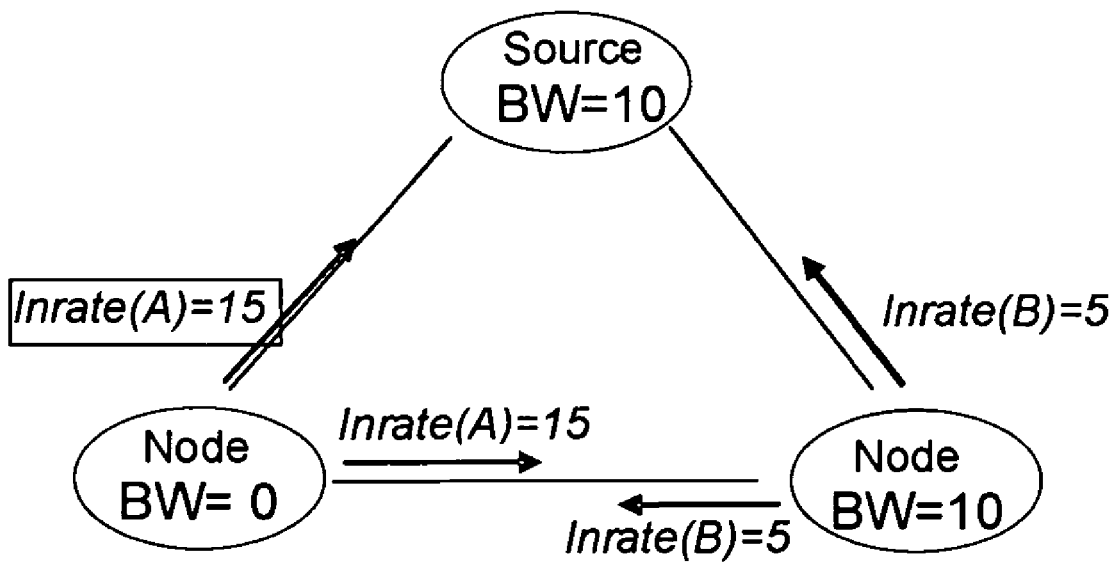
FIG. 4B is a simplified illustration of nodes calculating inrate, according to an embodiment of the present invention.

In step 230, each node i collects the current allocation from all nodes in its neighborhood. That information is then used to compute the current total incoming rate for node i as inrate (i)=sum (tr(j->i)) for all j in the neighborhood in step 240. Once computed, the inrate is announced to all nodes j in the neighborhood in step 250. See FIG. 4B for an illustration of this. Proceeding to step 260, each node collects the inrate from all nodes in i's neighborhood.

Lastly, in step 270 each node computes a dependency (dep (j->i) for all j in its neighborhood; this is also referred to as the bandwidth-per-non-source-connection (BPC). See FIG. 4C.

The dependency of a first node to a second node is the ratio of the bandwidth per connection of the second node to the sum of the bandwidth per connection of all nodes in the neighborhood of the first node. Node i calculates its dependency (dep) on its neighbor j in the following manner:

dep(j->i)=tr(i->j)/inrate(j), for all j in i's neighborhood.

Figure 4C:
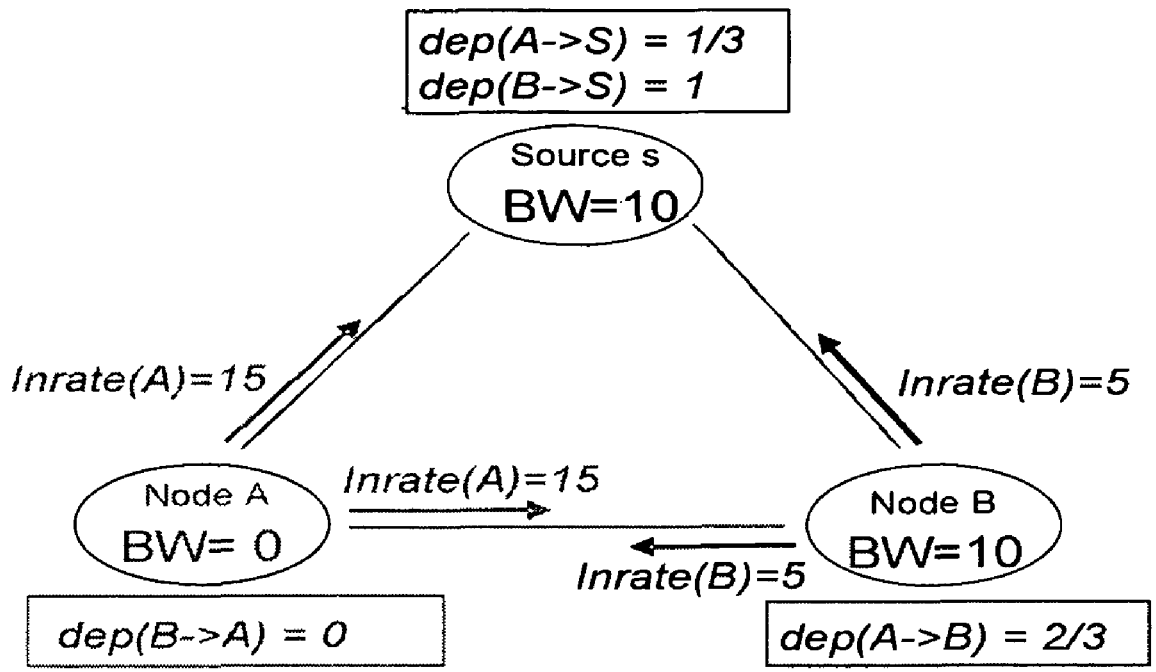
FIG. 4C is a simplified illustration of the nodes calculating dependency, according to an embodiment of the present invention.

Node i then communicates dep(j->i) to node j.

using FIG. 4C as an example, for source node, dep(A->s)=tr(s->A)/inrate(A=5/15=1/3; dep(B->s)=tr(s->B)/inrate(B)=5/5=1. for node B, dep(A->B) =tr(B->A)/inrate(A)=10/15=2/3 .

At the beginning of the next iteration, the target rate will be updated according to the algorithm. Node i calculates its target rate (tr) for its neighbor j in the following manner.

FIG. 3 shows the complete algorithm. First, it computes the average incoming rate for all neighbors as avg_inrate=sum (inrate(j))/# neighbors, for all j in neighborhood, then it computes a delta for each neighbor j as delta(j)=(avg_inrate−inrate(j))*dep(j->i). Based on the delta, it computes a trial rate allocation for each neighbor j as tr'(i->j)=max(0,tr(i->j)+delta(j)) and a total trial rate allocation TR'=sum(tr'(i->j)). Finally the new rate is calculated as tr(i->j)=tr'(i->j)/TR'*BW(i) where BW(i) is the total bandwidth of node i.

Figure 4D:
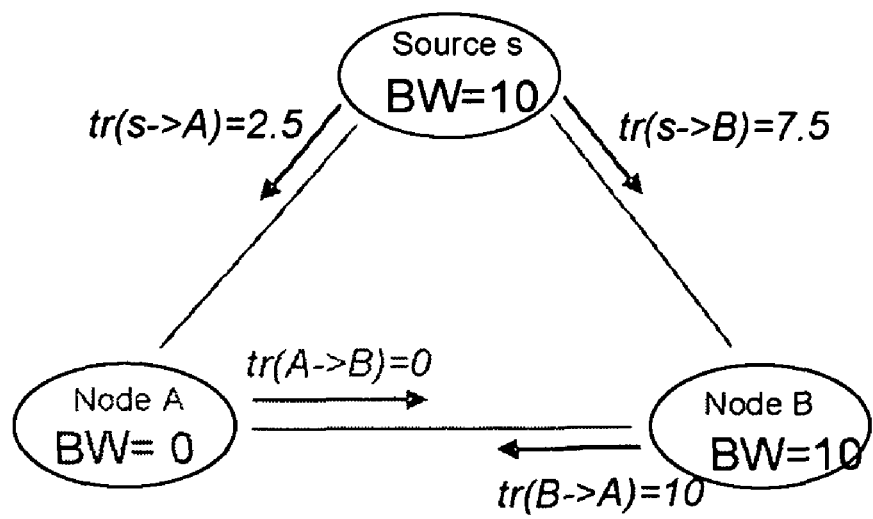
FIG. 4D is a simplified illustration of nodes' computation of a next iteration allocation, according to an embodiment of the present invention.

Again using FIG. 4C as an example, for the source node, s avg_inrate=20/2=10, delta(A)=(10−15)*1/3=−5/3, delta(B)=(10−5)*1=5, tr'(s->A)=5−5/3=10/3, tr'(s->B)=5+5=10, TR'=40/3. Therefore, tr(s->A)=(10/3)/(40/3)*10=2.5 and tr(s->B)=10/(40/3)*10=7.5. FIG. 4D shows this rate allocation in the new iteration. This allocation increases the streaming rate from 5 to 7.5. An equivalent calculation produces a rate allocation tr(B->A)=10.

All nodes advertise their BPC (bandwidth per connection) in their own local neighborhood. Using FIG. 1A as an example, the source node has bandwidth 10 and 2 non-source connections, so its BPC is 5. Node B's BPC is 10 since it has only one non-source connection.

Nodes periodically advertise their 'BPC' and 'dep' in their neighborhood to reflect topology changes in a local neighborhood and update their target rate (tr) values accordingly. To enforce a target rate, a node attaches its updated 'tr' value during the exchange of the chunk availability information (refer to the description of pull-based method). A pulling node i, i.e., a node requesting its missing chunks from one of its neighbors, keeps track of the current downloading rate from neighbor j as r(j,i). The residual bandwidth of node j is calculated as tr(j, i)−r(j,i). This residual bandwidth value is then used in subsequent pulling decisions based on the working set.

Using this invention, resources other than bandwidth, such as CPU cycles, can also be fairly allocated in a global scale using only local message passing in a stateless manner. For example, in a P2P computing environment consisting of computers with diverse computing powers forming a distributed or grid network, the invention can be used to decide CPU cycles allocated for the neighbors so that each node receives approximately equal computing powers.

Figure 5:
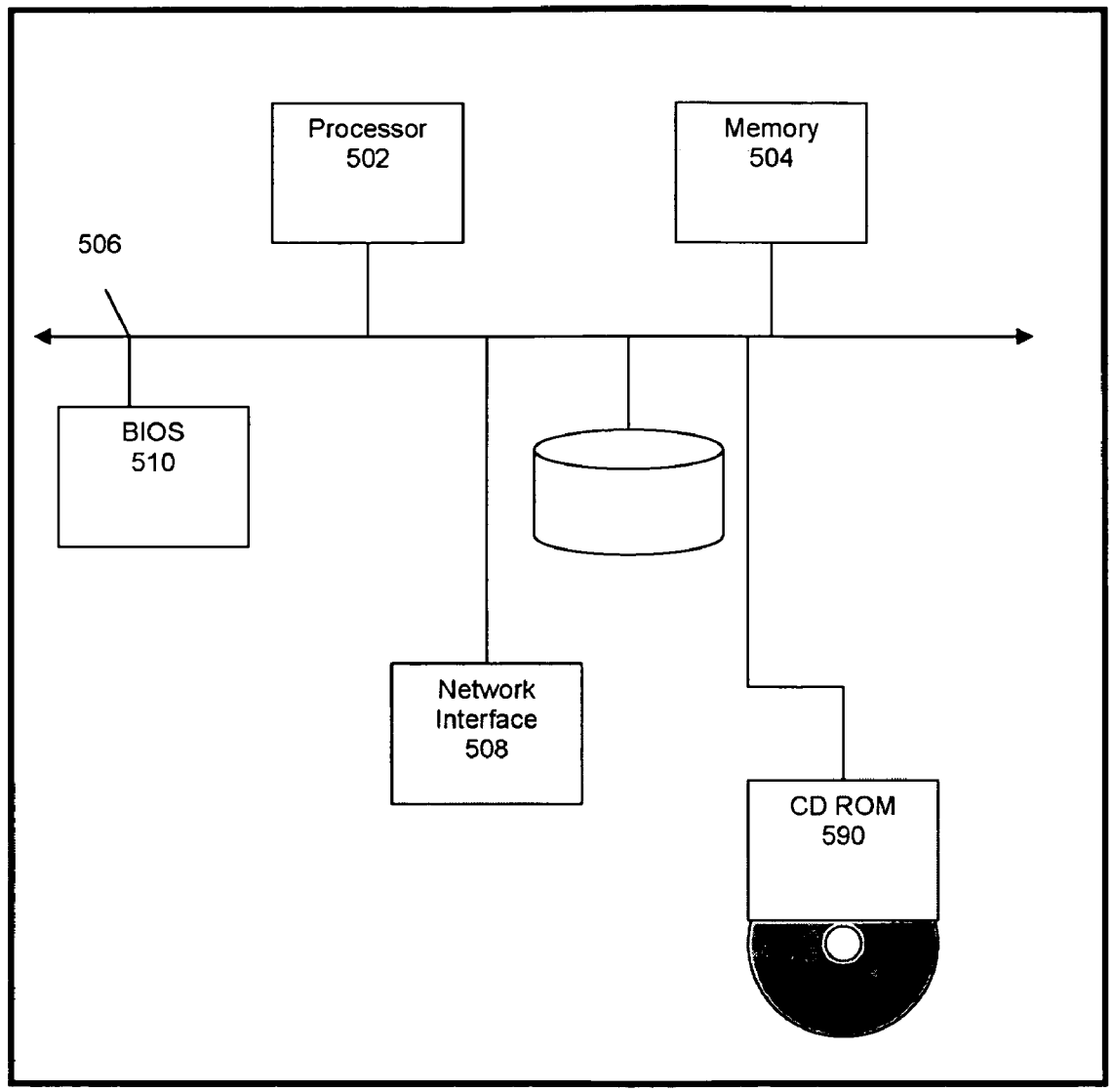
FIG. 5 is a simplified block diagram of an information processing system configured to operate according to an embodiment of the present invention.

Referring now to FIG. 5, there is shown an information processing system 500 in which the present invention may be implemented. System 500 is depicted in accordance with certain presently preferred embodiments of the invention. In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

For purposes of this invention, computer system 500 may represent any type of computer, information processing system or other programmable electronic device, including a client computer, a server computer, a portable computer, an embedded controller, a personal digital assistant, and so on. The computer system 500 may be a stand-alone device or networked into a larger system.

Throughout the description herein, an embodiment of the invention is illustrated with aspects of the invention embodied on computer system 500. As will be appreciated by those of ordinary skill in the art, aspects of the invention may be distributed amongst one or more networked computing devices which interact with computer system 500 via one or more data networks. However, for ease of understanding, aspects of the invention have been embodied in a single computing device--computer system 500.

Computer system 500 includes processor 502. Computer system 500 may include several components—central processing unit (CPU) 502, memory 504, network interface (I/F) 508 and I/O interface 510. Each component is in communication with the other components via a suitable communications bus 506 as required.

Memory 504 may include both volatile and persistent memory for the storage of: operational instructions for execution by CPU 502, data registers, application storage and the like. Memory 504 preferably includes a combination of random access memory (RAM), read only memory (ROM) and persistent memory such as that provided by a hard disk drive.

The computer instructions/applications stored in memory 504 and executed by CPU 502 (thus adapting the operation of computer system 500 as described herein) are illustrated in pseudo-code form in FIG. 3. As will be appreciated by those of ordinary skill in the art, the delineation between aspects of the applications illustrated as pseudo-code in FIG. 3 is somewhat arbitrary as the various operations attributed to a particular application as described herein may, in alternative embodiments, be subsumed by another application.

According to another embodiment of the invention, a computer readable medium, such as a CDROM 590 can include program instructions for operating the programmable computer 500 according to the invention.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

We claim:

1. A method for optimizing resource allocation, the method comprising steps of:
    inferring global properties of a neighborhood comprising peer nodes i from a summarization of information obtained locally at each peer node i, wherein the neighborhood is a set of all nodes with which the peer node i can potentially exchange data, and a neighbor node is a node j in the neighborhood other than the peer node i, the inferring step comprising:
        computing resource allocation dependencies of each peer node i based on local information, comprising steps of:
            computing network bandwidth dependencies for all nodes except source nodes;
            steps performed by each peer node i:

computing node i's current bandwidth allocation for each neighboring node j in the neighborhood;

notifying neighboring node j of its current allocation, for all node i's neighboring nodes, by sending messages;

collecting current allocations from all nodes j in the neighborhood;

computing a current total incoming rate for node i as a sum of the bandwidth allocations for all nodes j in the neighborhood;

notifying all nodes j of the current total incoming rate;

collecting all current incoming rates from all nodes in the neighborhood; and computing a dependency for each node j in the neighborhood as a ratio of the bandwidth per connection of each node j to the sum of the bandwidth per connection of all nodes in node i's neighborhood;

propagating the resource allocation dependency information for each peer node i to its neighboring nodes j;

calculating resource target rates for each neighbor node j; and allocating resources of each peer node i to its neighbor nodes j in accordance with the propagated dependency information.

2. The method of claim 1 wherein the method is performed for a server-less content distribution system.

3. The method of claim 2 wherein the server-less content distribution system comprises a mesh-based peer to peer system.

4. The method of claim 1 wherein the resource target rates are periodically updated as peer nodes join and leave the neighborhood.

5. The method of claim 1 further comprising:

monitoring a current downloading rate of all the neighboring nodes;

computing a residual bandwidth of the neighboring nodes; and using the residual bandwidth in subsequent pulling decisions based on a working set.

6. The method of claim 1 further comprising node i enforcing the target rate by attaching its target rate value during an exchange of chunk availability information.

7. A server-less content distribution system for optimizing resource allocation, the system comprising:

a peer to peer network comprising a plurality of processor nodes with varying resources for downloading and presenting media content, wherein each processor node comprises processing logic for:

inferring global properties of a neighborhood comprising peer nodes i from a summarization of information obtained locally at each peer node i, wherein the neighborhood is a set of all nodes with which the peer node i can potentially exchange data, and a neighbor node is a node j in the neighborhood other than the peer node i, the inferring step comprising:

computing resource allocation dependencies of each peer node i based on local information;

propagating the resource allocation dependency information for each peer node i to its neighboring nodes j;

calculating resource target rates for each neighbor node j; and allocating resource of each peer node i to its neighbor nodes j in accordance with the propagated dependency information;

wherein each processor node further comprises the processor logic for steps performed by each peer node i as part of the computing step:

computing node i's current resource allocation for each neighboring node j;

notifying neighboring node j of its current allocation, for all node i's neighboring nodes, by sending messages;

collecting current allocations from all nodes j in the neighborhood;

computing a current total incoming rate for node i as a sum of the bandwidth allocations for all nodes j in the neighborhood;

notifying all nodes j of the current total incoming rate;

collecting all current incoming rates from all nodes in the neighborhood; and computing a dependency for each node j in the neighborhood as a ratio of the resource per connection of each node j to the sum of the resource per connection of all nodes in i's neighborhood.

8. The system of claim 7 further comprising a media source that distributes the media content to the peer to peer network.

9. The system of claim 7 wherein the resource target rates are periodically updated as peer nodes join and leave the neighborhood.

10. The system of claim 7 wherein the peer to peer network comprises mesh-based peer to peer networks.

11. The system of claim 7 wherein each processor node further comprises the processor logic for:

monitoring a current resource allocation rate of all the neighboring nodes;

computing a residual resource allocation of the neighboring nodes; and using the residual resource allocation in subsequent pulling decisions based on a working set.

12. The system of claim 7 wherein each processor node further comprises the processor logic for: enforcing the target rate by attaching its target rate value during an exchange of chunk availability information.

13. The system of claim 7 wherein the peer node is a pulling node.

14. A method for optimizing resource allocation, the method comprising steps of:

inferring global properties of a neighborhood comprising peer nodes i from a summarization of information obtained locally at each peer node i, wherein the neighborhood is a set of all nodes with which the peer node i can potentially exchange data, and a neighbor node is a node j in the neighborhood other than the peer node i, the inferring step comprising:

computing resource allocation dependencies of each peer node i based on local information;

propagating the resource allocation dependency information for each peer node i to its neighboring nodes j;

calculating resource target rates for each neighbor node j comprising steps of:

calculating the network bandwidth target rates for each one of the neighboring nodes;

and further comprising steps performed by node i:

computing an average incoming rate for all neighboring nodes j as a sum of all incoming rates for each node j divided by an amount of neighbor nodes;

computing a delta for each node j as the average incoming rate minus the incoming rate of node j, multiplied by its dependency;

computing a trial allocation for each node j based on the delta as a maximum of zero and the current allocation plus the delta;

computing a total trial rate allocation as a sum of all trial allocations; and calculating the target rate as the trial allocation for node j divided by the total trial rate allocation multiplied by a total bandwidth of node i; and allocating resources of each peer node i to its neighbor nodes j in accordance with the propagated dependency information.

15. The method of claim 14 wherein the method is performed for a server-less content distribution system.

16. The method of claim 15 wherein the server-less content distribution system comprises a mesh-based peer to peer system.

17. The method of claim 14 wherein the resource target rates are periodically updated as peer nodes join and leave the neighborhood.

18. The method of claim 14 further comprising:

monitoring a current downloading rate of all the neighboring nodes;

computing a residual bandwidth of the neighboring nodes; and using the residual bandwidth in subsequent pulling decisions based on a working set.

19. The method of claim 14 further comprising node i enforcing the target rate by attaching its target rate value during an exchange of chunk availability information.

* * * * *